United States Patent

Hunter et al.

[11] 4,133,832
[45] Jan. 9, 1979

[54] BLOWING AGENTS -BIS(HYDROCARBYLSULFONYL) CARBOHYDRAZIDES

[75] Inventors: Byron A. Hunter, Woodbridge; Irwin A. Prager, Waterbury, both of Conn.

[73] Assignee: Uniroyal, Inc., New York, N.Y.

[21] Appl. No.: 902,627

[22] Filed: May 4, 1978

Related U.S. Application Data

[62] Division of Ser. No. 689,448, May 24, 1976, Pat. No. 4,096,100.

[51] Int. Cl.² ............................................. C08J 9/10
[52] U.S. Cl. ............................ 260/554; 260/556 H; 521/89; 521/180
[58] Field of Search ............... 260/554, 556 H, 2.5 R, 260/2.5 N, 2.5 H

[56] References Cited

U.S. PATENT DOCUMENTS

| | | | |
|---|---|---|---|
| 3,152,176 | 10/1964 | Hunter | 260/2.5 R |
| 3,235,519 | 2/1966 | Hunter | 260/2.5 R |
| 3,344,182 | 9/1967 | Amidoir | 260/554 |
| 3,903,151 | 9/1975 | Hunter | 260/2.5 R |
| 3,925,270 | 12/1975 | Hunter | 260/2.5 R |

Primary Examiner—Morton Foelak
Attorney, Agent, or Firm—Anthony Lagani, Jr.

[57] ABSTRACT

Hydrocarbylsulfonyl carbohydrazides of the following structural formulae are disclosed for use as blowing agents:

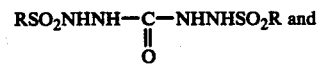

and

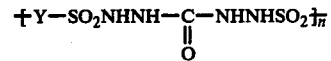

The compounds wherein the R groups are alkyl are novel, as are the polymeric products.

9 Claims, No Drawings

BLOWING AGENTS -BIS(HYDROCARBYLSULFONYL) CARBOHYDRAZIDES

This is a division, of application Ser. No. 689,448, filed May 24, 1976 now U.S. Pat. No. 4,096,100.

This invention relates to the manufacture of cellular polymeric materials. More particularly, the invention involves the application of certain compounds as expanding agents for rubbers and plastics. Specifically, the invention resides in the discovery that certain hydrocarbyl sulfonyl carbohydrazide compounds are valuable blowing agents in the manufacture of cellular polymeric materials. Futhermore it relates to some novel compounds suitable for these uses.

The application of heat sensitive organic nitrogen compounds as expanding agents for cellular polymers is well known. For example, azodicarbonamide(decomposition point about 200° C) has been widely employed as a blowing agent for rubbers and plastics. Other organic nitrogen compounds which have been used include the following:

oxybis(benzenesulfonyl hydrazide) (dec. 160° C) (U.S. Pat. No. 2,552,065)

p-toluenesulfonyl semicarbazide (dec. 235° C) (U.S. Pat. No. 2,491,709)

N,N'-Dinitroso-N,N'-dimethylterephthalmide (dec.90° C) (Fuller, M.R., *Ind. Eng. Chem.* 491 722 (1957)

As can be seen, the temperatures at which these various compounds produce gas varies over a wide range and, as may be expected, the applications in which each type may be used are restricted to the particular processing temperatures of particular polymers. Further restrictions on the application of specific blowing agents are imposed by the nature of the decomposition products, gaseous and otherwise. For example, polyester polymers are adversely affected by ammonia gas which is formed in the decomposition of azodicarbonamide and by p-toluene sulfonyl semicarbazide. Odorous decomposition products are formed during the decomposition of dinitroso pentamethylene tetramine restricting the use of this compound to the expansion of certain rubbery polymers wherein the odor is not a critical factor.

An object of the present invention is to provide superior expanding agents for polymers which are normally processed at temperatures above 210° C. A further object is to provide high temperature blowing agents which do not cause adverse effects on the stability or utility of the expanded polymer. A specific object is to provide expanding agents for polyester polymers.

The simple hydrocarbylsulfonyl carbohycrazide blowing agents of this invention can be illustrated by the structure:

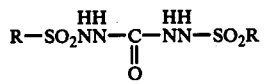

wherein R is a hydrocarbyl radical and preferably is an alkyl radical having 1 to 12 carbon atoms, most preferably 1 to 4 carbon atoms, an aryl radical having 6 to 12 carbon atoms, most preferably 6 to 10 carbon atoms; an aralkyl or alkaryl radical having 7 to 12 carbon atoms, most preferably aralkyl having 7 to 9 carbon atoms and alkaryl having 7 to 10 carbon atoms; a cycloalkyl radical having 5 to 9 carbon atoms, most preferably 5 to 6 carbon atoms.

The compounds wherein R is an alkyl radical are novel compounds. These alkyl derivatives are shown by example below to produce 50 to 100% more gas upon decomposition than the corresponding known aryl derivatives.

These compounds can be readily prepared by either of two methods:

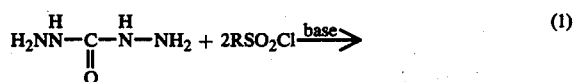

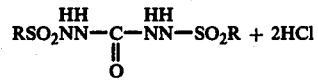

or

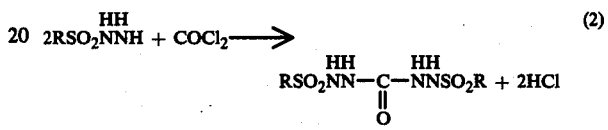

Method (1) has been employed by Cremlyn and Turner (J. Chem. Soc. 1970 C, 2629) to prepare several of these compounds wherein R is phenyl, p-tolyl or p-acetaminophenyl for testing as potential herbicides, but no suggestion as to the utility of the compounds as blowing agents is given.

Method (2) is novel.

A variation of the invention is found in the reaction products of bis(sulfonyl chlorides) with carbohydrazide to yield oligomeric products wherein n is from 2 to 50 or even higher:

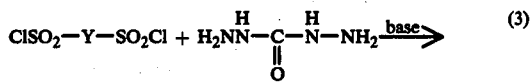

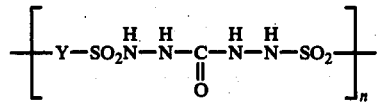

The resulting products are oligomers. An alternate procedure for producing these substances is given in equation (4)

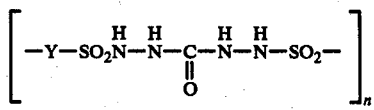

In both cases, Y is a difunctional organic moiety selected from arylene, preferably phenylene, alkarylene, preferably having 7 to 10 carbon atoms, and the structure $-R^1-A-R^2-$ wherein A is a single bond connecting $R^1$ and $R^2$ or is $-O-$, $-S-$, $-SO-$, $-SO_2-$, usually a single bond or $-O-$; or A is an alkylene radical having from 1 to 6 carbon atoms such as methylene, ethylene, propylene, tetramethylene and hexamethylene, or an alkylidene radical having 2 to 3 carbon atoms such as ethylidene and isopropylidene; and $R^1$ and $R^2$ are the same or different and are alkylene having 1 to 4 carbon atoms or phenylene.

Preferably Y is a radical such as phenylene, tolylene, xylylene, biphenylene, oxydiphenylene, 1,3-dimethylbenzene, and methylenebisphenylene. Other preferred species of Y include such as ethylene, butylene and hexamethylene.

Illustrative of the hydrocarbylsulfonyl carbohydrazides useful in the practice of this invention are the following:
1,5-bis(benzenesulfonyl) carbohydrazide
1,5-bis(p-toluenesulfonyl) carbohydrazide
1,5-bis(p-chlorobenzenesulfonyl) carbohydrazide
1,5-bis(methanesulfonyl) carbohydrazide
1,5-bis(ethanesulfonyl) carbohydroxide
1,5-bis(n-propanesulfonyl) carbohydrazide
1,5-bis(n-butanesulfonyl) carbohydrazide
1,5-bis(n-hexanesulfonyl) carbohydrazide
1,5-bis(isopropanesulfonyl) carbohydrazide
1,5-bis(tert-butanesulfonyl) carbohydrazide Also useful for the purposes of the invention are the reaction products of difunctional organic sulfonyl chlorides with carbohydrazide. Thus, carbohydrazide may be reacted with bis(lsulfonyl chlorides) such as the following:
Benzene-1,3-bis(sulfonyl chloride)
Benzene-1,4-bis(sulfonyl chloride)
1-Methylbenzene-2,4-bis(sulfonyl chloride)
1,3-Dimethylbenzene-4,6-bis(sulfonyl chloride)
p,p'-Oxybis(benzenesulfonyl chloride)
1,2-Ethanebis(sulfonyl chloride)
1,4-Butanebis(sulfonyl chloride)

Method 1 referred to above involves reacting carbohydrazide with a sulfonyl chloride in the presence of a base, at a temperature of from about 100m temperature up to about 100° C, and for a period of up to about 10 hours.

Preferably the sulfonyl chloride is added to a suspension of the carbohydrazide in the presence of the base. However, the order of addition may be reversed. Examples of suitable solvents include alcohols (i.e. methanol, ethanol, isopropanol) water, tetrahydrofuran, dimethylformamide, acetonitrile, ethylene dichloride, trichloroethylene, dibutyl ether, and the like. Examples of suitable bases include sodium bicarbonate, potassium bicarbonate, sodium or potassium carbonates or hydroxydes, as well as amines.

Method 2 referred to above involves reacting a sulfonyl hydrazide with phosgene ($COCl_2$) in the presence of a base, at a temperature of about 15° to 100° C, and for a period up to about 10 hours.

Preferably the phosgene is added to a suspension of the sulfonyl hydrazide in the presence of a base, and the temperature is maintained from about 15° to 50° C. However, the order of addition may be reversed. The solvents referred to for Method 1 are applicable for use herein. Preferably a water-alcohol mixture is used. The bases used for Method 1 are also suitable for use herein.

Each of the above methods may readily be conducted at atmospheric pressure, and higher or lower pressures are not necessary though they may be used.

The chemicals of this invention are useful in the expansion of polymeric gas-expandable materials. They are characterized by relatively high decomposition points (well in excess of 200° C) and thus are particularly valuable in the formation of cellular plastic articles which are expendable at these relatively high temperatures. The quantity of gas produced by the compounds varies considerably with the nature of the various substituents. Usually the compounds producing the largest amount of gas are the most valuable. However, the decomposition temperature and the nature of the decomposition residue are also factors in the utility of the compounds as blowing agents.

One outstanding feature of these compounds is the absence of ammonia in the decomosition gases. Ammonia is known to produce deleterious effects in some expandable plastics. In any case, the bis(hydrocarbylsulfonyl) carbohydrazides of this invention are particularly valuable in the expansion of plastics requiring processing temperature well in excess of 200° C.

The polymeric materials which may be expanded by these blowing agents include homopolymers, interpolymers, graft polymers, and mixtures and blends of two or more of these, and include thermoplastic, thermosetting, and rubbery polymers. The new blowing agents are useful for expanding polymers that have high processing temperatures such as the polycarbonates, phenylene oxide-based resins, polyaryl sulfones, the various nylons, polyesters, certain polystyrenes, polypropylene, poly(styrene-acrylonitrile), polyacetals, poly(vinyl chloride), poly(vinyl acetate), poly(phenylene sulfide), poly(methylpentene), low and high density polyethylenes, polyimides, polyaryl ethers, ABS polymers, polyacrylics, cellulosic polymerics, halogenated polymers, especially the fluoroplastics, poly(ethlene-vinyl acetate), etc. Other polymers include poly(butadiene-styrene), polyisoprene (including natural rubber), cis- or trans-polybutadiene, butyl rubber, ethylene-propylene copolymers, ethylene-propylene-non-conjugated diene terpolymers, and poly(butadiene-acrylonitrile).

Generally, the amount of blowing agent used will depend on the nature of the polymer to be expanded, and the desired density of the foam to be produced. Usually, 0.05 to 15, and most often, 0.2 to 5.0 parts of blowing agent are employed, based on 10 parts of polymer by weight. The blowing agents can be used alone, or in combination with other blowing agents. Activating substances an be used to increase the efficiency of gas evolution, or to lower the normal decomposition temperature of the blowing agents of the invention. Other additives such as plasticizers, fillers, nucleating agents, an the like an also be added to the polymer to be expanded.

The following examples illustrate the preparation of some of the bis(hydrocarbylsulfonyl) carbohydrazides of the invention, their efficiency as gas producing agents upon decomposition, an their use as blowing agents for producing expanded materials.

Example I

Preparation of 1,5-bis(benzenesulfonyl) carbohydrazide 175.6 g (1.0 mole) of benzenesulfonyl chloride was added to a stirred mixture of 45 g (0.5 mole) carbohydrazide and 100 g sodium bicarbonate in 1000 ml ethanol in a 3 liter 3 neck flask. The mixture was heated to gentle reflux for six hours. The cooled mixture was filtered and the solid precipitate (containing the desired product along with sodium chloride) was washed with ethanol and dried. Yield: 207 g. This mixture was then suspended in water and stirred for 10 minutes. The insoluble solid was filtered off and washed well with water and dried. Yield: 120.5 g, m.p. 227° C (dec.)

A portion (30 g) of the product was taken up in concentrated ammonium hydroxide, diluted some with water and filtered. The solution was then acidified with dilute sulfuric acid. The resulting white solid was filtered, washed with water and dried. Yield: 28 g, m.p. 230° C (dec.)

| Analysis: Calc. for $C_{13}H_{14}N_4O_5S_2$ | | | Found |
|---|---|---|---|
| % | C | 42.1 | 41.65 |
|  | H | 3.80 | 3.78 |
|  | N | 15.1 | 14.89 |

Example II

Preparation of 1,5-bis(p-toluene sulfonyl) carbonydrazide 190.5 g (1.0 mole) p-toluene sulfonyl chloride, 45 g (0.5 mole) carbohydrazide, 84 g (1.0 mole) sodium bicarbonate and 1000 ml methanol were placed in a 2 liter flask. The mixture was stirred and heated to reflux (65° C) for 90 minutes. Carbon dioxide evolution was complete at this point. The solid produce and sodium chloride were filtered off. The material was suspended in water to dissolve the sodium chloride and the residual solid product was filtered off, washed well with water, and dried at 60 C. Yield: 139 g Dec. temp. 232° C A portion was dissolved in dioxane and reprecipitated by adding an equal volume of 50% ethanol. The resulting product (after drying) decomposed at 235° C.

| Analysis: Calc. for $C_{15}H_{18}N_5O_5S_2$ | | | Found |
|---|---|---|---|
| % | C | 45.27 | 45.47 |
|  | H | 4.52 | 4.59 |
|  | N | 14.07 | 13.67 |

Example III

Preparation of 1,5-bis(p-chlorobenzenesulfonyl carbohydrazide.

211 (1.0 mole) p-chlorobenzenesulfonyl chloride was added to a suspension of 45 g (0.5 mole) carbohydrazide and 100 g sodium bicarbonate in 1000 ml ethanol in a 3 liter reaction flask. The mixture was stirred and heated gradually to gentle reflux (80° C) as carbon dioxide was evolved. Heating was continued until $CO_2$ no longer evolved (3 hours). The mix was cooled to 20 C and filtered. The mixture of product and sodium chloride was dried at 60° C. Yield = 227 g. The solid mixture was suspended in 2000 ml water, stirred to dissolve the sodium chloride, and then the insoluble product was filtered, washed and dried. Yield = 129 g, m.p. 239-240° C (dec.)

A portion was purified by solution in ammonium hydroxide, followed by filtration and acidification of the filtrate with dilute sulfuric acid. The washed and dried product had the following analysis:

| Calc. for $C_{13}H_{12}N_4O_5Cl_2S_2$ | | | |
|---|---|---|---|
| % | C | 35.53 | |
|  | H | 2.73 | |
|  | N | 12.76 | |

Example IV

Preparation of 1,5-bis(methanesulfonyl) carbohydrazide

A mixture of 45 g (0.5 mole) carbohydazide, 84 g $NaHCO_3$ (1.0 mole) and 50 ml methanol was stirred as 114.5 g (1.0 mole) methane sulfonyl chloride was added over 30 minutes. The temperature rose from 25° C to 40° C. The stirring was continued for 15 minutes (temp. 44° C). The mixture was then heated to 65° C for two hours, and was then cooled to 25° C and the solid product (including sodium chloride) was filtered and washed with methanol and dried. Yield: 146 g. The material was first suspended in water to remove sodium chloride and then filtered, washed with water and dried. Yield: 81 g, m.p. = 207° C dec.

A portion of the product was recrystallized from water and had a melting point of 210° C.

| Analysis: Calc. for $C_3H_{10}N_4O_5S_2$ | | | Found |
|---|---|---|---|
| % | C | 14.60 | 14.99 |
|  | H | 4.07 | 4.15 |
|  | N | 22.7 | 22.03 |
|  | S | 26.0 | 25.59 |

Example V

Preparation of 1,5-bis(ethanesulfonyl) carbohydrazide

A mixture of 45 g (0.5 mole) carbohydrazide, 85 g $NaHCO_3$ (1.0 mole) and 250 ml methanol was stirred and 128.5 g (1.0 mole) ethane sulfonyl chloride was dropped in. The temperature rose from 25° C to 45° C during the reaction which took 1 hour. Stirring was continued for two hours. The produce was filtered, washed and dried. Yield: 145.9 g m.p. 195° C.

A portion was recrystallized from water and has a melting point of 191-192° C.

| Analysis: Calc. for $C_5H_{14}N_4O_5S_2$ | | | Found |
|---|---|---|---|
| % | C | 21.8 | 21.32 |
|  | H | 5.1 | 5.01 |
|  | N | 20.4 | 19.76 |
|  | S | 23.3 | 23.17 |

Example VI

Preparation 1,5-bis(n-propanesulfonyl) carbohydrazide

Into a 1-liter reaction flask was charged 29.5 g (0.2 mole) n-propane sulfonyl chloride, 200 ml ethanol, 9 g (0.1 mole) carbohydrazide and 16.8 g (0.2 mole) sodium bicarbonate. The mix was stirred and heated gradually to 80° C over a one hour period and was then allowed to reflux for four hours. The separated sodium chloride wa filtered off (hot). The filtrate was cooled whereupon the crystalline produce separated (17 g) m.p. 191-194° C.

Upon recrystillization from methanol the product melted at 194-196° C.

| Analysis: Calc. for $C_7H_{18}N_4O_5S_2$ | | | Found |
|---|---|---|---|
| % | C | 27.81 | 27.13 |
|  | H | 5.96 | 6.04 |
|  | N | 18.54 | 18.33 |

Example VII

Preparation of 1,5-bis(n-butanesulfonyl) carbohydrazide

A mixture of 11.25 g (0.125 mole) carboxydrazide, 25 g sodium bicarbonate, 200 ml methanol and 37 g (0.25 mole) 1-butanesulfonyl chloride was heated to 60° C until evolution of $CO_2$ ceased. The mix was cooled and water was added to precipitate the product. The initial precipitate weighed 12 g (dry). This melted with decomposition at 195–197° C.

| Analysis: Calc. for $C_9H_{22}N_4O_5S_2$ | | Found |
|---|---|---|
| % C | 32.60 | 32.12 |
| H | 6.67 | 6.83 |
| N | 16.95 | 16.97 |

The filtrate deposited 8.0 g more product on standing.

Example VIII

Reaction product of carbohydrazide with p,p'-oxybis(benzenesulfonyl chloride) (1:1)

77.4 g (0.2 mole) p,p'-oxybis(benzenesulfonyl chloride), 18 g (0.2 mole) carbohydrazide, 33.6 g (0.4 mole) sodium bicarbonate in a mixture of 100 ml water and 300 ml ethanol was stirred for two hours while carbon dioxide was evolved. The temperature was then raised to 70° C (reflux temperature) for one hour. Then 500 ml water was added to the mix and the separate solid was filtered off, washed with water, and dried (60° C). Yield: 66 g dec.: 223° C.

This material was completely soluble in ammonium hydroxide. Reprecipitation of the compound from the clear filtrate by addition of dilute acid gave material which decomposed at 230° C.

Example IX

Reaction product of Carbohydrazide with 4,4'-biphenylenebis(sulfonyl chloride) (1:1)

A mixture of 70.2 g (0.2 mole) 4,4'bisphenylenebis(sulfonyl chloride), 18 g (0.2 mole) carbohydrazide, 33.6 g (0.4 mole) sodium bicarbonate in a mixture of 300 ml ethanol and 100 ml water was stirred for two hours. Carbon dioxide was evolved. The mix was then warmed to reflux temperature (70°) for one hour. Water (500 ml) was then added and the product was filtered off, washed wall with water, and dried. Yield: 62 g, dec. 235° C.

This product was completely soluble in ammonium hydroxide solution. When reprecipitated from the ammoniacal solution with acid, the product (washed and dried) decomposed at 240° C.

Example X

Reaction Product of Carbohydrazide and 1,3-di-methylbenzene-4,6-disulfonyl chloride A mixture of 18.0 g carbonhydrazide (0.2 mole), 40.0 g sodium bicarbonate, 400 ml methanol and 60.6 g (0.2 mole) 1,3-dimethylbenzene-4,6-disulfonyl chloride was heated to reflux for two hours. Evolution of carbon dioxide occurred during the first ½ hour. The mixture was cooled to 20° C and 1 liter of water was added with stirring for ½ hour. The product was filtered off, washed with water and dried. Yield: 40 g.

The resultant product was polymeric.

Example XI

Preparation of 1,5-bis(benzenesulfonyl) carbohydrazide from benzenesulfonyl hydrazide and phosgene.

A mixture of 86 g (0.5 mole of benzenesulfonyl hydrazide, 270 ml ethanol, 30 ml water and 42.5 g (0.5 mole) of sodium bicarbonate was stirred in a 1-liter 3-necked flask as 27 g (0.25 mole + 10% excess) of phosgene was bubbled into the mix. The temperature rose to 45° C and the mix was cooled to prevent further temperature rise. The stirring was continued for one hour and the mix was then cooled to 20° C. The white crystalline product was filtered off, washed well with water, and dried at 60° C. Yield: 57 g (61.6%)

This product decomposed at 242° C.

| Analysis: Calc. for $C_{13}H_{14}N_4O_5S_2$ | | Found |
|---|---|---|
| % C | 42.16 | 41.98 |
| H | 3.78 | 3.70 |
| N | 15.14 | 14.58 |

10 g of the above product was dissolved in conc. ammonium hydroxide (completely soluble) and reprecipitated with dilute acid. Yield: 9.0 g, Dec. pt. 235° C.

Example XII

Preparation of 1,5-bis(p-toluenesulfonyl) carbohydrazide from p-toluenesulfonyl hydrazide and phosgene.

In a manner similar to that described in Example XI, a mixture of 93 g (0.5 mole) of p-toluenesulfonyl hydrazide, 360 ml ethanol, 40 ml water and 42 g (0.5 mole) sodium bicarbonate was stirred in a 1-liter 3-necked flask as 27 g (0.25 mole plus 10% excess) of phosgene was bubbled through the stirred mixture. The product was filtered off, washed with water and dried. Yield: 62 g, dec. 237° C.

A portion of the product was dissolved in concentrated ammonium hydroxide (completely soluble) and reprecipitated with acid. The washed and dried product decomposed at 234° C.

| Analysis: Calc. for $C_{15}H_{18}N_4O_5S_2$ | | Found |
|---|---|---|
| % C | 45.23 | 45.00 |
| H | 4.57 | 4.44 |
| N | 14.07 | 13.54 |

Example XIII

Preparation of 1,5-bis(p-chlorobenzene sulfonyl) carbonydrazide from the corresponding sulfonyl hydrazide and phosgene A mixture of 51.5 g (0.25 mole) of p-chlorobenzene sulfonyl hydrazide, 180 ml ethanol, 20 ml water and 21 g (0.25 mole) of sodium bicarbonate was stirred in a 1-liter three necked flask as 13.5 g (0.125 mole plus 5% excess) of phosgene was bubbled through. After one hour the product was filtered off, washed with water and dried. Yield: 34 g, dec. 254° C.

| Analysis: Calc. for $C_{13}H_{12}N_4O_5S_2Cl_2$ | | Found |
|---|---|---|
| % C | 35.54 | 34.82 |
| H | 2.73 | 2.71 |
| N | 12.76 | 12.15 |

Example XIV

Preparation of 1,5-bis(3,4-dichlorobenzenesulfonyl) carbohydrazide from the corresponding sulfonyl hydrazide and phosgene.

A mixture of 24.1 g (0.1 mole) 3,4-dichlorobenzene sulfonyl hydrazide, 180 ml ethanol, 20 ml water and 8.4 g (0.1 mole) sodium bicarbonate was stirred in a 1-liter three necked flask as 5.5 g (0.055 mole) of phosgene was bubbled in. After one hour the product was filtered off, washed with water and dried. Yield: 16.0 g, dec. 232° C. This product was recrystallized from a 90–10 mix of ethanol and acetonitrile. Recovered 11 g, dec. 235° C.

| Analysis: Calc. for $C_{13}H_{10}N_4O_5S_2Cl_4$ | | Found |
|---|---|---|
| % C | 30.71 | 30.45 |
| H | 1.97 | 1.99 |
| N | 11.02 | 10.63 |

Example XV

Preparation of 1,5-bis(t-butylbenzenesulfonyl) carbohydrazide.

A mixture of 45.6 g (0.2 mole) of p-t-butyl benzene sulfonyl hydrazide, 180 ml ethanol, 20 ml water and 16.2 g (0.2 mole) sodium bicarbonate was stirred in a 1-liter 3-necked flask as 10.9 g (0.11 mole) of phosgene was bubbled in. The mix was stirred for one hour and the product filtered off, washed with water and dried. Yield: 36 g, melting range: 172–185° C, dec. 180–240° C.

This product was treated with boiling hexane, and the insoluble material was filtered from the hot solution. Recovered 26 g, m.p. 212–214° C, dec. 214–240° C.

| Analysis: Calc. for $C_{21}H_{30}N_4O_5S_2$ | | Found |
|---|---|---|
| % C | 52.28 | 51.87 |
| H | 6.22 | 6.24 |
| N | 11.62 | 11.11 |

Example XVI

Preparation of 1,5-bis(n-butanesulfonyl) carbohydrazide

A mixture of 76 g (0.5 mole) of butane sulfonyl hydrazide, 180 ml ethanol, 20 ml water and 42 g (0.5 mole) sodium bicarbonate was stirred as 27 g (0.0275 mole) of phosgene was passed in. The mix was stirred for one hour and the product was filtered, washed with water and dried.

Yield: 47 g, m.p. 205–207° C, dec. 207–240° C. This material was completely soluble in concentrated ammonium hydroxide. When recrystallized from aqueous ethanol (50/50) the product melted at 205–207° C.

| Analysis: Calc. for $C_9H_{22}N_4O_5S_2$ | | Found |
|---|---|---|
| % C | 32.73 | 32.05 |
| H | 6.67 | 6.66 |
| N | 16.97 | 16.16 |

Example XVII

Gas Evolution Data on Bis(hydrocarbylsulfonyl) Carbohydrazides

The gas evolution of several of these compounds was determined according to standard procedures. The results were as follows:

| | Temp. °C | CC/G STP |
|---|---|---|
| 1,5-Bis(benzenesulfonyl) carbohydrazide | 240–300 | 164 |
| 1,5-Bis(p-toluenesulfonyl) carbohydrazide | 235–300 | 148 |
| 1,5-Bis(p-chlorobenzenesulfonyl) carbohydrazide | 255–310 | 147 |
| 1,5-Bis(methanesulfonyl) carbohydrazide | 225–260 | 297 |
| 1,5-Bis(ethanesulfonyl) carbohydrazide | 235–280 | 255 |

Example XVIII

Expansion of Polysulfone Polymer

Polysulfone pellets were pre-dried by heating at 250° F for three hours. The the pellets were then coated with 1% by weight of blowing agent by thoroughly mixing the resin and the blowing agent in a glass jar. The uniformly coated pellets were introduced into a pre-heated laboratory extruder where the temperatures in ° F were: rear —520, front — 580, die — 520; the screw speed was 30 RPM at the stock temperature shown below. The specific gravity of the unexpanded polysulfone resin was 1,19893. The temperature profile varied depending upon the blowing agent used.

| Blowing Agent | Stock Temp. ° F. | Specific Gravity |
|---|---|---|
| 1,5-Bis(methanesulfonyl) carbohydrazide | 530 | 0.71747 |
| 1,5-Bis(ethanesulfonyl) carbohydrazide | 520 | 0.84019 |
| 1,5-Bis(n-propanesulfonyl) carbohydrazide | 530 | 0.79952 |
| 1,5-Bis(n-butanesulfonyl) carbohydrazide | 530 | 0.93845 |
| 1,5-Bis(benzenesulfonyl) carbohydrazide | 525 | 0.82189 |
| 1,5-Bis(p-chlorobenzenesulfonyl) carbohydrazide | 520 | 0.74316 |
| R.P. p,p'-oxybis(benzenesulfonyl chloride) and carbohydrazide (1:1) | 520 | 0.76361 |
| R.P. 4,4'-biphenylene bis (sulfonyl chloride) and carbohydrazide | 530 | 0.80201 |
| Control (no blowing agent) | 525 | 1.19999 |

Example XIX

Expansion of Thermoplastic Polyester with 1,5-bis(p-toluenesulfonyl) carbohydrazide Valox (trademark) thermoplastic polyester was coated with 0.3% by weight of 1.5 bis(p-toluenesulfonyl) carbohydrazide in a drum tumbler. The coated pellets were introduced into a commercial Beloit Siemag Structural St 6000/115 120 ton clamp extruder under the following operating conditions:

| Zone Temperatures, °F | |
|---|---|
| Zone 1 | 430° |
| 2 | 465° |
| 3 | 480° |
| 4 | 475° |
| 6 | 460° |
| 7 | 440° |
| Mold Temperature | 180° F |
| Melt temperature | 470–490° F |
| Injection pressure | 11,000 psi |
| Back pressure | 400 psi |
| Injection speed | 0.8 sec. |
| Screw speed | 30 rpm |
| Cycle | 1.5 min. |
| Mold | 1" × 1" × ⅛" plaque |

Density measurements on the expanded plaque showed a 40% reduction when compared to the unexpanded polymer.

What is claimed is:

1. A bis(hydrocarbylsulfonyl) carbohydrazide having the formula

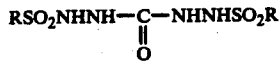

wherein R is an alkyl radical having 1 to 12 carbon atoms.

2. The carbohydrazide of claim 1 wherein R is an alkyl radical having 1 to 4 carbon atoms.

3. The carbohydrazide of claim 1 wherein R is methyl.

4. The carbohydrazide of claim 1 wherein R is ethyl

5. An oligomeric (hydrocarbylsulfonyl) carbohydrazide of the formula

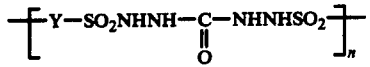

wherein Y is a difunctional organic moiety selected from the group consisting of phenylene, alkarylene having 7 to 10 carbon atoms and a group of the structure $R^1-A-R^2$ wherein A is selected from a single bond connecting $R^1$ and $R^2$, —O—, —S—, —SO—, —SO$_2$—, alkylene with 1 to 6 carbon atoms, and alkylidene with 2 to 3 carbon atoms, wherein $R^1$ and $R^2$ are the same or different and are alkylene having 1 to 4 carbon atoms or phenylene, and wherein n is an integer of from 2 to about 50.

6. The carbohydrazide of claim 5 wherein Y is phenylene.

7. The carbohydrazide of claim 5 wherein Y is alkarylene having 7 to 10 carbon atoms.

8. The carbohydrazide of claim 7 wherein Y is tolylene.

9. The carbohydrazide of claim 7 wherein Y is xylylene.

* * * * *